March 24, 1959  H. R. BAKER  2,879,147
METHOD OF ETCHING GLASS
Filed Aug. 17, 1956
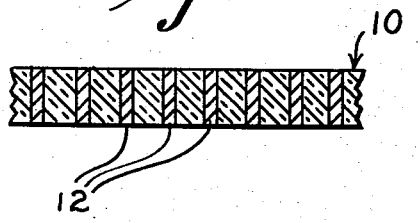
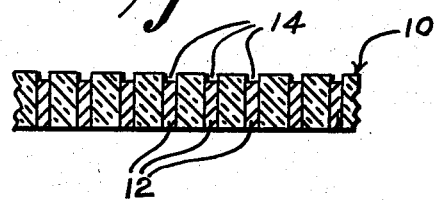
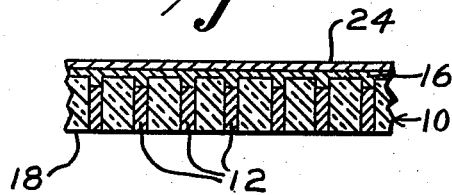
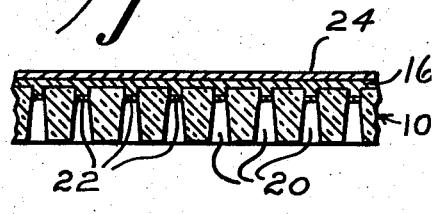
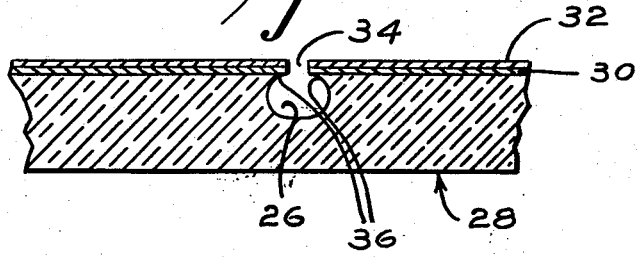
INVENTOR.
HOUSTON R. BAKER
BY Clarence R. Patty, Jr.
ATTORNEY

United States Patent Office 2,879,147
Patented Mar. 24, 1959

2,879,147

METHOD OF ETCHING GLASS

Houston R. Baker, Lancaster, Ohio

Application August 17, 1956, Serial No. 604,708

16 Claims. (Cl. 41—43)

This invention relates to a method of selectively etching glass and is particularly concerned with protecting a portion of the glass surface during the etching process. While the invention has general application in glass etching, it is of particular value in conjunction with a method of etching perforations or holes through a glass body wherein a selected portion of the glass is transformed to establish a solubility differential so that one portion of the glass is completely dissolved by an etching fluid such as dilute hydrofluoric acid while the remainder is substantially unchanged.

This latter method of etching glass is described in United States Patent No. 2,628,160, issued February 10, 1953, to Stanley Donald Stookey. The patent teaches that a solubility or etching rate differential can be established in a glass by forming opacifying crystallites of lithium silicate, barium disilicate, or alkali metal fluoride in a portion of the glass. The patent further describes various glasses and methods of treating such glasses to effect the desired transformation, and reference is made to the more detailed discussion of the patent in these respects.

The Stookey etching procedure opens up many new possibilities in the production of perforated glass articles largely because it substantially minimizes the undesirable undercutting inherent in prior etching procedures. In glass perforating, undercutting results from etching fluids dissolving along lateral as well as transverse lines thus enlarging hole diameters beyond desired limits. Experience has shown, however, that even the relatively insignificant amount of undercutting or lateral etching which occurs in conjunction with the new method may still be sufficient to render the method ineffective for certain types of perforating operations requiring extremely close dimensional control. In particular, problems have been encountered in attempting to produce glass aperture masks for use in cathode ray tubes adapted to receive televised pictures in color.

The aperture mask referred to is a thin sheet of material provided with a multitude of small, uniformly spaced perforations or holes which may number on the order of a few thousand per square inch. It is mounted in a cathode ray tube between the electron emitting means and the face plate or screen and is so oriented or aligned with respect to these two elements that electron beams passing through the apertures impinge at desired points on the screen while all other electron beams are intercepted by the mask. In order to properly perform this electron filtering function the apertures must be formed with extreme accuracy and close dimensional tolerances, the specifications for one type of mask requiring, for example, that the hole diameters be 9.5±0.5 mils.

The etching procedure described in the Stookey patent, particularly the photographic method utilizing a photosensitive glass, gave promise of being peculiarly adapted to the production of this type of article in glass. In attempting to produce aperture masks by such practice, however, it was observed that some portions of a glass plate tended to etch through more rapidly than other parts. It was also observed that a slight amount of lateral etching or undercutting occurred while etching of the remainder of the plate was being completed, thus resulting in those portions of the plate which etched through more rapidly having holes slightly larger than the remainder of the plate and outside the specified limits. The difference in etching rates encountered may be due to a number of factors such as slight variations in glass thickness or in etching bath temperature and inhomogeneities in the composition of either the glass or the etching bath. While it is theoretically possible to adequately control these various conditions, it is generally impractical to do so and the need for further improvements in the etching procedure readily became apparent.

It is a purpose of the present invention then to provide such improvements. A further purpose is to provide a means of controlling the action of an etching fluid on glass. A still further purpose is to permit the production of aperture masks and similar accurately perforated or otherwise etched articles in glass.

The purposes and advantages of the invention will become more apparent from the following description taken in conjunction with the drawing in which, Figs. 1–4 are sectional views of a glass plate at various stages of a perforation process in accordance with the present invention, Fig. 5 is a fragmentary, sectional view of a glass article etched in accordance with a further embodiment of the invention.

In general the method of selectively etching a glass body in accordance with the present invention comprises applying, over a portion of the glass surface which it is desired to protect, a coating which exerts a neutralizing effect on the etching fluid employed, and thereafter applying etching fluid to the portion of the glass to be etched, the coating material reacting with the etching fluid to form a barrier to etching of the coated portion of the glass.

The coating material contains as its essential active ingredient a water soluble, boron containing material. I have found that such materials, when applied as a continuous film or coating over a glass surface and then contacted on the coating-glass interface with a hydrofluoric acid etching solution, tend to produce a thin insoluble membrane which is effective in preventing further etching of the glass beyond the membrane. Furthermore, the boron material tends to react with, and neutralizes, any hydrofluoric acid passing through the membrane. The exact nature of the membrane is not clear but from the manner in which it is formed and its solubility characteristics it is believed to be a complex fluoride.

In order that the protection provided may be completely effective, it is essential that the coating be in intimate contact with the glass surface to be protected and be free from discontinuities such as cracks or streaks. It is desirable therefore to use an aqueous coating containing a water-soluble borate material which can be flowed or otherwise applied over a glass surface in a thin layer and then dried and baked to a continuous, adherent film or layer. Such borate materials include, among others, boric acid, borax and other alkali-metal borates either separately or mixed.

By way of further illustrating the invention the following exemplary coating solutions are given in parts by weight:

| | 1 | 2 | 3 | 4 | 5 |
|---|---|---|---|---|---|
| $H_3BO_3$ | 10 | | 10 | 16 | 14.5 |
| $Na_2B_4O_7 \cdot 10H_2O$ | | 10 | 10 | 10 | |
| $Na_4P_2O_7$ | | | | | 19 |
| $H_2O$ | 50 | 50 | 50 | 50 | 50 |

For optimum results in protective film formation, it has been found desirable to employ a borate-phosphate mixture, soluble phosphates such as sodium pyro- or orthophosphate and the corresponding phosphoric acids being satisfactory sources of the phosphate component. A particularly effective solution is that shown in Example 5 of the table above which, on the anhydrous oxide basis, corresponds in percent by weight to 37% $P_2O_5$, 30% $B_2O_3$ and 33% $Na_2O$.

In addition to the essential borate component and the optional phosphate component the coating may also contain any other material compatible with the formation of an adherent, continuous film on drying. Among such other materials are alkaline earth salts such as $CaCl_2$ and the fluorides formed in the etching bath. In some instances the presence of these materials may even be desirable in promoting the formation of a smooth, amorphous layer and avoiding the type of crystallization which would introduce discontinuities in the film.

By way of specific illustration, the present invention is first described as a modification of the Stookey etching method for forming perforations in glass articles. This embodiment involves etching into one surface of a suitably treated glass article a pattern of shallow cavities corresponding to the desired perforation pattern, applying over this initially etched surface a coating of material which upon contact with the etching fluid produces a neutralizing effect on such fluid, and thereafter etching through the glass article from the opposite surface.

The steps in producing a perforated glass article such as an aperture mask by this method are illustrated in Figs. 1–4. A thin sheet of photosensitive glass 10 is employed, preferably produced from a glass capable of having opacifying lithium silicate crystallites developed therein by a photographic method such as described in Patent No. 2,628,160 previously referred to. An opacified crystallite pattern or image 12 corresponding to the desired perforation pattern, is developed within photosensitive glass sheet 10 by first exposing the glass to shortwave radiations, such as ultra-violet radiations, through a negative or other suitable pattern-bearing screen. This brings about an invisible change in the irradiated portions of the glass whereby these portions are converted into the desired opacified crystallite pattern by a subsequent heat treatment of the glass, while the non-irradiated portions remain substantially unchanged during such heating. It will be appreciated that the relative dimensions of the perforations and their pattern, as well as those of the glass sheet, are greatly distorted for purposes of illustration.

At least one surface or side of partially opacified glass sheet 10 is then exposed to a spray, stream, or bath of a dilute hydrofluoric acid solution, preferably a 10% solution, for a matter of a few minutes to pre-etch, that is etch prior to the principal etching operation, a pattern of shallow cavities 14 on the exposed surface as shown in Fig. 2. In producing an aperture mask it is ordinarily sufficient to pre-etch the glass to a depth on the order of 10 mils. It will be understood that, while only one surface need be pre-etched, the glass article may be immersed if desired and both surfaces pre-etched.

After the pre-etching operation, the pre-etched surface which is to be protected against further etching is covered with a layer of dissolved coating material. The coating material may be applied in various manners including dipping the glass in the coating solution, or flowing the solution over the glass surface. It may also be applied by conventional brushing, screening or spraying techniques. The viscosity of the solution is adjusted to suit the particular manner of application by varying the water content.

The coated glass is then substantially completely dried, preferably at a temperature somewhat above the boiling point of water, to provide a smooth continuous film 16 which completely covers and adheres to the pre-etched surface including the shallow etched cavities 14, as most clearly shown in Fig. 3. The drying temperature should not be so high that bubbling or foaming occurs in the coating since this may produce discontinuities or occlusions. I have found that for most coatings optimum results are obtained by drying at a temperature of about 140° C. After drying, the glass is immersed in a tank of etching solution, or otherwise exposed to the etching solution, and perforation pattern 12 etched in glass sheet 10 from surface 18 opposite that to which the etch resist coating 16 has been applied.

As the removal of the glass from each perforation or aperture by the etching fluid is completed to form cavities 20, as shown in Fig. 4, the dilute hydrofluoric acid reacts with the borate coating material to form a fine membrane 22 which effectively stops activity of the acid beyond that point. The beveled walls on cavities 20 illustrate the effects of lateral etching. There is, however, no opportunity for portions 14 of the apertures formed in the initial pre-etch step to become enlarged or laterally etched during the time required to complete etching of those apertures which dissolve more slowly. Thus the effective size of any given aperture as well as the uniformity of size within the sheet is controlled by the pattern formed during the pre-etch step regardless of what occurs during formation of the remainder of the aperture in the principal and more extended etching operation. It is essential, therefore, to produce a continuous interface between the pre-etched surface of the glass sheet and the etch resistant coating that is substantially free from occlusions such as gas bubbles or interruptions such as cracks, since otherwise some of the preformed cavities or partial apertures will be unprotected. Experience has shown that trapping of gas in the cavities and the like leads to spotty masks which must be rejected.

Since the coating material is water soluble, contact with moisture must be avoided and it is desirable that the coating be effectively sealed against any source of moisture. A thin adherent layer of wax 24, applied over the coating material as shown in Figs. 3 and 4, accomplishes this purpose and permits immersion of the glass article in a bath of etching solution, the wax being resistant to attack by hydrofluoric acid.

Upon completion of the etching process the wax layer 24 is loosened and stripped or floated off and the coated glass rinsed in warm water to remove etch resistant coating 16. If the glass is rinsed by impinging streams of water against, or at an angle to, the etched surface, it is possible to mechanically wash out the thin membranes 22 and thus cleanse the perforations. Alternatively the perforations may be cleaned out by dipping in a chemical solvent such as a warm solution of $NaOH$ or $Na_3PO_4$. Perforated glass sheet 10 is then rinsed and dried for subsequent use.

By utilizing the improvements of the present invention, I have found it possible to produce glass aperture masks in which the hole diameters do not vary by more than 0.1 mil from the specified dimension. Thus the successful production of apertured articles of this sort has been made practical. It will be appreciated, of course, that perforated articles other than aperture masks may be made by the present method including screens, filters and the like.

Furthermore, the method of the present invention provides advantages in other glass etching procedures. For example in marking glassware such as pipettes, graduates and other chemical apparatus it is customary to cut or etch markings on glass and then fill these markings with enamel or other ceramic filler. However, such fillers do not always adhere well and may be easily removed. It would then be highly advantageous to undercut the surface glass and lock the enamel in. My present invention provides a practical means of accomplishing such undercutting by protecting the surface glass during etching.

This embodiment of the invention is illustrated in Fig. 5 which shows, in fragmentary section, a glass wall designated by numeral 28 having a marking cavity 26 etched therein. In carrying out the process, glass wall 28 is first covered with a borate-containing etch-resist coating 30 which may be compounded and applied as described earlier. Coating 30 is dried and wax coating 32 is then applied in superimposed relation.

Desired markings, such as that indicated at 34, are then scribed or cut through the wax and resist layers to expose corresponding portions of the glass surface. The marked article is then exposed to etching fluid, such as dilute hydrofluoric acid, to remove glass in desired areas. The etching fluid tends to dissolve both vertically and laterally where the glass is exposed, to form cavity 26. However, a thin shelf of glass 36 is not removed. It is believed that the resist coating 30 in addition to protecting the surface with which it is in immediate contact, also reacts with the etching acid to provide a protective barrier over the inside face of this shelf. In any event, experience has shown that etching proceeds in the manner indicated, thus providing an undercut cavity which may then be filled with enamel or other ceramic filling to provide a locked-in marking.

What is claimed is:

1. In a method of selectively etching perforations through a glass body wherein a selected portion of the glass is transformed to establish a solubility differential so that one portion of the glass dissolves in hydrofluoric acid at a different rate from the remaining portion of the glass, the improvement which comprises etching into one surface of the glass a shallow pattern corresponding to the desired perforation pattern and applying over this initially etched surface, including the etched cavities therein, a coating composed in part at least of a borate compound and reactive with hydrofluoric acid to produce an etch-resistant reaction product while said glass is being etched.

2. The method of claim 1 in which the applied coating is in the form of a thin, continuous, adherent film.

3. The method of claim 1 in which the applied coating contains borate and phosphate components.

4. In a method of selectively etching perforations through a glass body wherein a selected portion of the glass is transformed to establish a solubility differential so that one portion of the glass dissolves in a glass etching fluid at a different rate from the remaining portion of the glass, the improvement which comprises pre-etching one surface of the glass body for several minutes with a dilute solution of hydrofluoric acid to form a shallow etched pattern corresponding to the desired perforation pattern, applying over the pre-etched surface, including the etched cavities therein, an aqueous solution containing a borate component, substantially completely drying such coating at a temperature above the boiling point of water to form an adherent, continuous film free from occlusions at its glass interface, applying over such film a wax coating that is insoluble in water and resistant to hydrofluoric acid, exposing the opposite surface of the glass to a dilute hydrofluoric acid solution to complete formation of the perforations from that surface and formation of an insoluble membrane at the glass-borate coating interface, removing the wax and borate coatings and washing the membranes out of the perforations.

5. The method of claim 4 in which the coating is dried at a temperature of about 140° C.

6. The method of selectively etching perforations in a glass article which comprises effecting a transformation in a portion of the glass to cause that portion to etch at a different rate than the remainder of the glass, pre-etching a shallow pattern corresponding to the desired perforations on one surface of the glass, applying over the pre-etched surface, including the etched cavities therein, a coating containing a borate compound and being reactive with hydrofluoric acid to produce a reaction product which is resistant to attack by such acid, and thereafter applying hydrofluoric acid to the opposite surface of the glass article.

7. The method of selectively etching perforations in a glass article which comprises effecting a transformation in a portion of the glass to cause that portion to etch at a different rate than the remainder of the glass, pre-etching a shallow pattern corresponding to the desired perforations on one surface of the glass, applying over the pre-etched surface, including the etched cavities therein, a coating which contains a borate compound and is reactive with hydrofluoric acid to produce an etch-resistant reaction product, treating the uncoated surface of the glass with a dilute solution of hydrofluoric acid to complete etching of the desired perforations, the etching fluid in each perforation reacting with the coating as etching of the perforation is completed to form an insoluble membrane which prevents further etching in the portion of the perforation initially etched, and removing the etch resist from the glass surface and the membranes from the perforations.

8. The method of claim 7 in which the reactive coating is a water soluble film.

9. The method of claim 7 in which the coating is in turn covered with a water-insoluble material which is resistant to attack by the etching fluid.

10. The method of selectively etching perforations in an article comprising a body made of a photosensitively opacifiable glass, which comprises exposing such article to shortwave radiations to form in a selected portion of the glass body a latent photographic image, heating the article to convert the latent image to an opacified image comprising opacifying crystallites selected from the class consisting of a lithium silicate, barium disilicate and an alkali metal fluoride, while leaving the remaining portion of the glass clear and unopacified, treating the article with a dilute aqueous solution of hydrofluoric acid to partially dissolve one of such portions while leaving the other portion substantially unchanged, applying to one of the partially etched cavities therein a coating which contains a borate compound and is reactive with the etching acid to produce an etch-resistant reaction product, sealing such coating against moisture contact, treating the uncoated surface of the glass with a dilute solution of hydrofluoric acid to complete etching of the desired perforations, the etching fluid in each perforation reacting with the coating, as etching of the perforation is completed, to form an insoluble membrane which prevents further etching in the portion of the perforation initially etched and removing the etch resist from the glass surface and the membranes from the perforations.

11. The method of claim 10 in which the opacifying crystallites formed in the glass are lithium disilicate.

12. A method of selectively etching a glass body with hydrofluoric acid which comprises applying a coating to that portion of the glass surface which is to remain unetched, said coating containing a borate compound reactable with a hydrofluoric acid etching solution to form an insoluble and etch resistant reaction product, and thereafter contacting the glass with a hydrofluoric acid etching solution to permit attack by the solution on that portion of the glass to be etched and to react the etching solution with the coating to form an etch resistant layer of reaction product.

13. A method in accordance with claim 12 wherein the applied coating consists of a borate compound.

14. In a method of selectively etching glass with hydrofluoric acid where a portion of the glass is protected from etching by an etch resistant coating, the improvement which comprises forming the etch resistant coating by applying to that portion of the glass to be protected a coating which contains a borate compound reactive with hydrofluoric acid to produce an insoluble and etch resistant layer of reaction product and reacting said coating with the hydrofluoric acid solution employed to etch the remainder of the glass.

15. A method of etching an undercut cavity into a glass body with hydrofluoric acid which comprises applying over the glass surface a coating composed in part at least of a borate compound, superimposing on this coating a second coating composed of water-insoluble material which is resistant to attack by the etching acid, removing portions of the super-imposed coatings to expose portions of both the glass surface and the initial coating on such surface and thereafter applying hydrofluoric acid to the exposed portions to react with the coating containing a borate compound to produce an etch-resistant reaction product and to etch the exposed portion of the glass to produce the desired undercut cavity.

16. A method of marking a glass article which comprises coating the surface of the article with a material containing a borate compound, superimposing on such coating a second coating composed of water-insoluble material which is resistant to attack by hydrofluoric acid, removing portions of the superimposed coatings to expose the glass article surface in a pattern corresponding to that of the desired marking, applying hydrofluoric acid to the exposed portion of the initial coating to react therewith and produce an etch-resistant reaction product and to the glass surface to etch an undercut cavity in the glass article, and thereafter filling such cavity with a marking material.

References Cited in the file of this patent

UNITED STATES PATENTS

| | | |
|---|---|---|
| 2,127,781 | McKay | Aug. 23, 1938 |
| 2,337,460 | French | Dec. 21, 1943 |
| 2,347,011 | Walker | Apr. 18, 1944 |
| 2,596,617 | Teal | May 13, 1952 |
| 2,628,160 | Stookey | Feb. 10, 1953 |
| 2,749,794 | O'Leary | June 12, 1956 |